O. P. COBB.
NUT-LOCK.
No. 175,427.
Patented March 28, 1876.
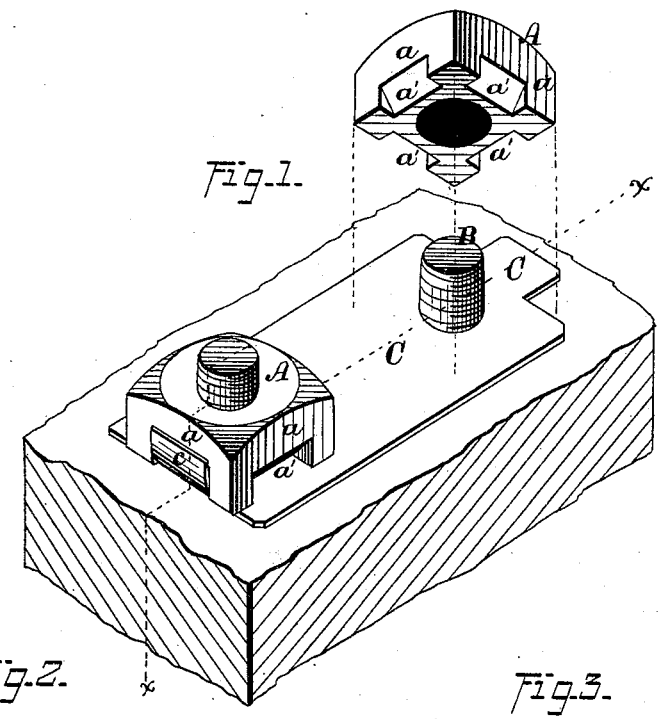
Fig. 1.
Fig. 2.
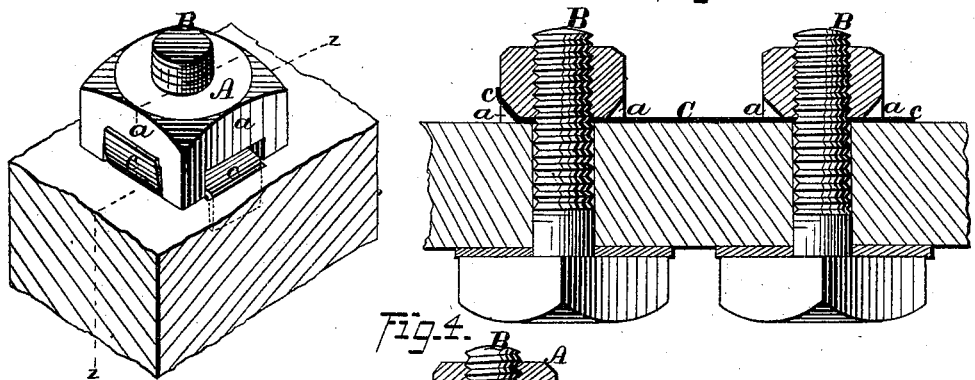
Fig. 3.
Fig. 4.
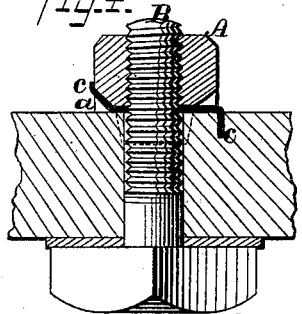

UNITED STATES PATENT OFFICE.

OLIVER P. COBB, OF AURORA, INDIANA.

IMPROVEMENT IN NUT-LOCKS.

Specification forming part of Letters Patent No. 175,427, dated March 28, 1876; application filed February 9, 1876.

*To all whom it may concern:*

Be it known that I, O. P. COBB, of Aurora, in the county of Dearborn and in the State of Indiana, have invented certain new and useful Improvements in Nut-Locks; and do hereby declare that the following is a full, clear, and exact description thereof, reference being had to the accompanying drawing, making a part of this specification, in which—

Figure 1 is a perspective view of my invention, as applied to the locking of two nuts, one of said nuts being detached so as to show its lower side. Fig. 2 is a like view of said invention, applied to a single nut; and Figs. 3 and 4 are central sections upon lines $xx$ and $zz$, respectively, of Figs. 1 and 2.

Letters of like name and kind refer to like parts in each of the figures.

The design of my invention is to enable nuts to be easily and securely locked in place and prevented from being turned by the jar or motion of the parts with which they are connected; and to this end it consists in the peculiar form of the nut and locking-plate and their combination with each other, substantially as and for the purpose hereinafter specified.

In the annexed drawings, A represents a nut which has any desired number of sides, $a$ and $a$, and is provided within the lower corner of each side $a$ with a notch, $a'$, that inclines inward and downward, and has parallel sides. Before placing the nut A upon a bolt, B, a thin plate of sheet metal, C, is placed over said bolt and said nut, then screwed to place. Upon the ends (and, if desired, the sides) of said plate C are provided radial tongues $c$ and $c$, which correspond in width to the like feature of the notches $a'$ and $a'$, and when either of said notches are caused to coincide with either of said tongues, the latter is turned upward into engagement therewith and effectually locks said nut in place.

It will be seen that it is of no consequence to cause the tongue to embrace closely the bottom of the notch and side of the nut, as in other forms of nut-locks, the locking of said nut being rendered perfect by the slightest engagement of the edges of said tongue with said notch, while to move said nut, without first disengaging said tongue, would require sufficient force to break the latter in the line of its greatest strength.

When used for connecting the ends of railroad-rails, or in other places where two bolts come near each other, the locking-plate C is caused to span both bolts, as shown by Figs. 1 and 3, and is thus prevented from turning; but for use with a single bolt, said plate has the form of a Greek cross, and one or more of its tongues are turned downward into suitable channels provided in the material upon which it rests. If used upon wood, said tongues may be caused to form their own channels.

In consequence of the small angle to which the tongues are bent, each may be used a number of times without breaking.

Having thus fully set forth the nature and merits of my invention, what I claim as new is—

The nut A, provided within the lower edge of each side $a$ with a mitered notch, $a'$, in combination with a sheet-metal plate, C, having one or more tongues, $c$, which may be turned upward and caused to engage with said notch, substantially as and for the purpose specified.

In testimony that I claim the foregoing I have hereunto set my hand this 1st day of February, 1876.

OLIVER P. COBB.

Witnesses:
WALTER V. DENTON,
PETER W. WILLIAMS.